US006960727B2

(12) United States Patent
Hering

(10) Patent No.: US 6,960,727 B2
(45) Date of Patent: Nov. 1, 2005

(54) ELECTRICAL APPARATUS WITH COVER FOR RETRACTABLY HOUSING AN ELECTRICAL CABLE CONNECTED THERETO

(75) Inventor: Jean-Marc Hering, Salo (FI)

(73) Assignee: Nokia Corporation, Espoo (FI)

( * ) Notice: Subject to any disclaimer, the term of this patent is extended or adjusted under 35 U.S.C. 154(b) by 52 days.

(21) Appl. No.: 10/646,339

(22) Filed: Aug. 22, 2003

(65) Prior Publication Data

US 2005/0042914 A1 Feb. 24, 2005

(51) Int. Cl.[7] .................................................. H02J 7/00
(52) U.S. Cl. .................... 174/135; 174/72 A; 320/111; 320/113; 191/12.2 R; 191/12.4; 439/501; 439/4; 439/131; 439/171; 439/172; 439/173; 439/174; 439/956
(58) Field of Search ............................. 174/135, 72 A; 320/111, 113; 191/12.2 R, 12.4; 439/501, 439/4, 131, 171–174, 956

(56) References Cited

U.S. PATENT DOCUMENTS

| | | | | |
|---|---|---|---|---|
| 5,511,120 A | | 4/1996 | Hirata et al. | |
| 5,684,883 A | | 11/1997 | Chen | |
| 5,832,098 A | | 11/1998 | Chen | |
| 5,923,147 A | * | 7/1999 | Martensson | 320/111 |

FOREIGN PATENT DOCUMENTS

| | | |
|---|---|---|
| GB | 2318930 A | 5/1998 |
| JP | 10190798 | 11/1993 |
| JP | 07263057 | 10/1995 |
| JP | 07143214 | 7/1998 |
| WO | WO 99/60764 | 11/1999 |

OTHER PUBLICATIONS 2 pages from cableorganizer.com website, publication date unknown.

* cited by examiner

*Primary Examiner*—Dean A. Reichard
*Assistant Examiner*—Jinhee Lee
(74) *Attorney, Agent, or Firm*—Ware, Fressola, Van Der Sluys & Adolphson LLP

(57) ABSTRACT

An AC adapter has a deformable cover located on an outer surface of the housing and defines an interior cavity between the inner surface of the cover and the housing surface for manual retraction and housing of the electrical cable when the electrical apparatus is not in use. The electrical cable may be manually retracted and wound around an internal tower for storage or may be manually withdrawn for connection to the electrical device with which the adapter is used. Alternately, the cover is flipped up to manually retract the electrical cable after which the cover is flipped down to house the retracted electrical cable when the apparatus is not in use. The cover may be flipped up to manually pay off a desired length of the electrical cable as desired.

13 Claims, 4 Drawing Sheets

ELECTRICAL APPARATUS WITH COVER FOR RETRACTABLY HOUSING AN ELECTRICAL CABLE CONNECTED THERETO

TECHNICAL FIELD

The present invention relates generally to electrical apparatus of the type having a transformer in a housing coupled to a source of commercial AC power and an electrical cable delivering power to an electrical device with which the apparatus is used. The invention deals more specifically with a cover integrally carried on the transformer housing surface for manual retraction and housing of the electrical cable.

BACKGROUND OF THE INVENTION

It is known to use AC adapters to provide power to portable electronic devices such as laptop computers, mobile telephones, and other such portable electronic devices and for charging batteries powering such devices. These AC adapters may typically have a transformer carried in the housing. An electrical plug compatible with the electrical service of a given country is provided for connection to a commercial AC electrical output to provide input power to the adapter. An electrical cable generally having a suitable power plug is also provided for delivering power to the electronic device with which the adapter is used. The AC adapter may be of different operational modes and have means to function for example, as a switch mode power supply, voltage regulator, AC to DC converter or in other operational electrical circuit configuration means necessary to provide the desired power to the electronic device with which the adapter is used. The electrical plug may be integral with the housing to provide a "wall mounted" unit wherein the adapter is plugged directly into the AC outlet without an intervening cord. The electrical cable coupling the AC adapter to the electronic device with which the adapter is used is of an indeterminate length sufficient to reach from the commercial AC outlet to the location of the electronic device. In some instances, the electrical cable may be upwards of ten (10) feet.

One disadvantage associated with such AC adapters is there is no convenient method or means for housing the electrical cable when the AC adapter is not in use and the electrical cable becomes twisted, tangled and knotted.

A further disadvantage is the electrical cable may become twisted, tangled or knotted when the AC adapter is in use because the full length of the electrical cable may not be required between the AC outlet and the electronic device.

Various mechanical mechanisms have been proposed for use in electronic devices to automatically retract cords such as earphone/microphone chords, data/telephone line chords and the like. Typically such mechanisms are used for retracting relatively small flexible cables such as used for earphone/microphone and data connections and are not suitable for heavier electrical cables such as power cables used to carry power from an AC adapter to an electronic device. Additionally, such mechanical devices and winding mechanisms are complex, and costly. Further, integration of such retraction mechanisms add to the cost and weight of the electronic apparatus utilizing such mechanisms.

Cable organizing devices have been proposed for the manual retraction and storage of excess cable length. These devices are typically accessory devices and not part of the AC adapter consequently subject to detachment from the cable and separation from the adapter. Further, such organizers take up additional storage room when the adapter is not in use.

It would be desirable therefore to provide an inexpensive and convenient means for manual retraction and storage of the electrical cable of an AC adapter.

Accordingly, it is an object of the present invention to provide a convenient and inexpensive means for manual retraction of the electrical cable of an AC adapter for housing the electrical cable when the AC adapter is not in use and such that when in use, a desired length of the electrical cable is withdrawn for connection to the electrical device with which the AC adapter is used.

SUMMARY OF THE INVENTION

In accordance with a first aspect of the invention, an electrical apparatus of the type having a transformer carried in a housing and an electrical cable for coupling the transformer output to an electrical device with which the apparatus is used is presented. The electrical apparatus is characterized by a cover located on an outer surface of the transformer housing and an interior cavity defined between the inner surface of the cover and the transformer housing outer surface. The interior cavity retractably houses the electrical cable within the interior cavity when the electrical apparatus is not in use and when in use, a desired length of the electrical is withdrawn from the interior cavity for connection to the electrical device. The cover is made of a resilient deformable material of a suitable type having a shape retention memory wherein the cover is flipped up away from the transformer housing outer surface so that the inner surface of the cover faces outward and a portion of the inner surface of the cover juxtapositioned with the transformer housing outer surface defines a tower around which the electrical cable is manually retracted and wound. The cover is flipped down toward the transformer housing outer surface for retaining the retracted electrical cable in the interior cavity defined between the inner surface of the cover and the transformer housing outer surface. The cover may be flipped up to manually pay off a desired length of the electrical cable.

In a further aspect of the invention, a closeable opening is defined along and between the peripheral lip of the cover and the transformer housing outer surface through which closeable opening the electrical cable is manually retracted into the interior cavity and wound around a tower defined within the interior cavity. Additionally, the electrical cable passes through the closeable opening when manually uncoiled from the tower to pay off a desired length of the electrical cable.

Preferably, the electrical apparatus has an electrical plug integral with the housing for coupling a source of commercial electrical power to the transformer input.

Preferably, the electrical apparatus is a charger.

Preferably, the electrical apparatus is a charger and the electrical device is a mobile phone.

Preferably, the electrical apparatus is a switched mode power converter and said electrical device is a mobile phone.

In another aspect of the invention, an electrical apparatus includes a housing for carrying a transformer that has an input and output. An electrical plug integral with the housing is provided for coupling an AC commercial voltage outlet to the transformer input. An electrical cable has one end coupled to the transformer output and an opposite end terminated in a suitable power plug for coupling the transformer output to a desired electronic device. A cover made of a resilient deformable material has shape retention memory characteristics and is located integral with and on an outer surface of the housing. An interior cavity is defined between the inner surface of the cover and the outer surface of the housing. The interior cavity is further defined by a continuous wall having an inner peripheral wall portion and an outer peripheral wall portion spaced from the inner peripheral wall portion. The inner peripheral wall portion juxtapositioned the housing outer surface defines a tower around which the electrical cable is manually retracted and wound for storage within the interior cavity.

In a yet further aspect of the invention, a method is presented for retractably housing the electrical cable in an electrical apparatus of the type having a transformer carried in a housing for coupling the transformer output to an electrical device with which the electrical device is used and includes the steps of: providing a cover; locating the cover on an outer surface of the transformer housing to define an interior cavity between the inner surface of the cover and the transformer housing outer surface; retractably housing the electrical cable within the interior cavity when the electrical apparatus is not in use, and withdrawing a desired length of the electrical cable from the interior cavity for connection to the electrical device.

Preferably, the method further includes the steps of: providing a cover made of a resilient deformable material having a shape retention memory; flipping the cover up away from the transformer housing outer surface whereby the inner surface of the cover faces outward and a portion of the outwardly facing inner surface juxtaposed with the transformer housing outer surface defines a tower; manually retracting and winding the electrical cable around the tower, and flipping the cover down toward the transformer housing outer surface to retain the retracted electrical cable.

Preferably the method further includes the steps of: providing a closeable opening along and between the peripheral lip of the cover and the transformer housing outer surface, and manually retracting the electrical cable into the interior cavity through the closeable opening.

Preferably, the method further includes the step of winding the electrical cable around a tower defined within the interior cavity.

BRIEF DESCRIPTION OF THE DRAWINGS

Other features, benefits and objects of the present invention will become more apparent from the following written description taken in conjunction with the drawings wherein.

DETAILED DESCRIPTION OF PREFERRED EMBODIMENTS

Figure 1:
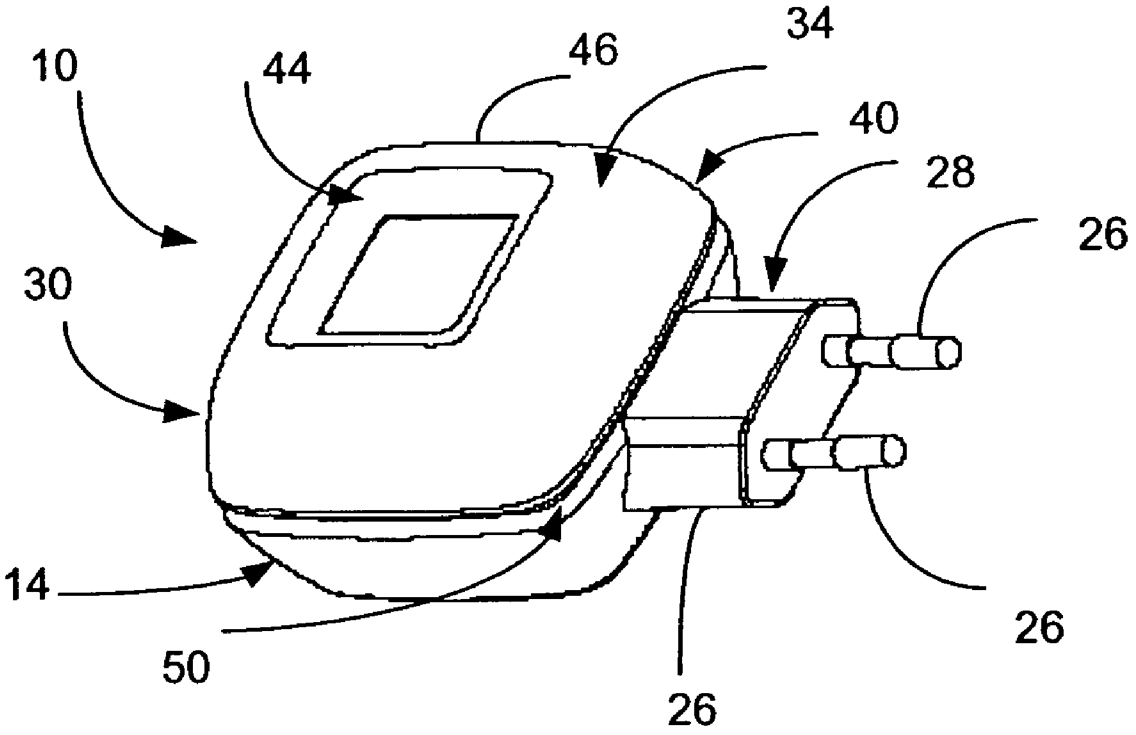
FIG. 1 is a perspective top view of electrical apparatus with a cover embodying the present invention for manual retraction and housing of the electrical cable.

Turning now to the drawings, FIGS. 1 to 4, and considering the invention in further detail, electrical apparatus generally designated 10 of the type having a transformer generally designated 12 carried in a housing 14 includes an electrical cable 16 having one end 18 coupled to the transformer output and an opposite end 20 having a suitable configured power plug 22 for connection to an electrical device with which the electrical apparatus 10 is used. The electrical apparatus 10 includes an electrical plug 24 having suitably configured and arranged prongs 26 arranged for insertion and electrical connection with a commercial AC power outlet (not shown). The electrical plug 24 is configured and arranged to be integral with the housing 14 such that the housing 14 and electrical plug 24 form and define a unitary assembly 28. Further, the electrical plug 24 may alternately be located and positioned at any desired location on the housing suitable to permit insertion of the prongs 26 into a power outlet. It will also be noted by those skilled in the art that there are many different prong arrangements and configurations to accommodate the electrical power distribution schemes as used in various different countries and accordingly all such prong and plug arrangements are contemplated by the present invention.

A cover generally designated 30 is arranged and located on an outer surface 32 of the housing 14. The cover 30 has an outer surface 34 and an inner surface 36. The cover 30 has an outer peripheral edge 40 and a inner peripheral edge 42 in a spaced relation with the outer peripheral edge 40 defining an open end of the cover 30 therebetween generally designated 43 and terminating substantially at the outer surface 32 of the housing 14. The cover 30 may be of any desired geometric shape and contour having a continuous wall portion with an interior wall 44 extending to an outer wall 46 and defining an interior cavity 38 between the cover inner surface 36 and the outer surface 32 of the housing 14.

Figure 2:
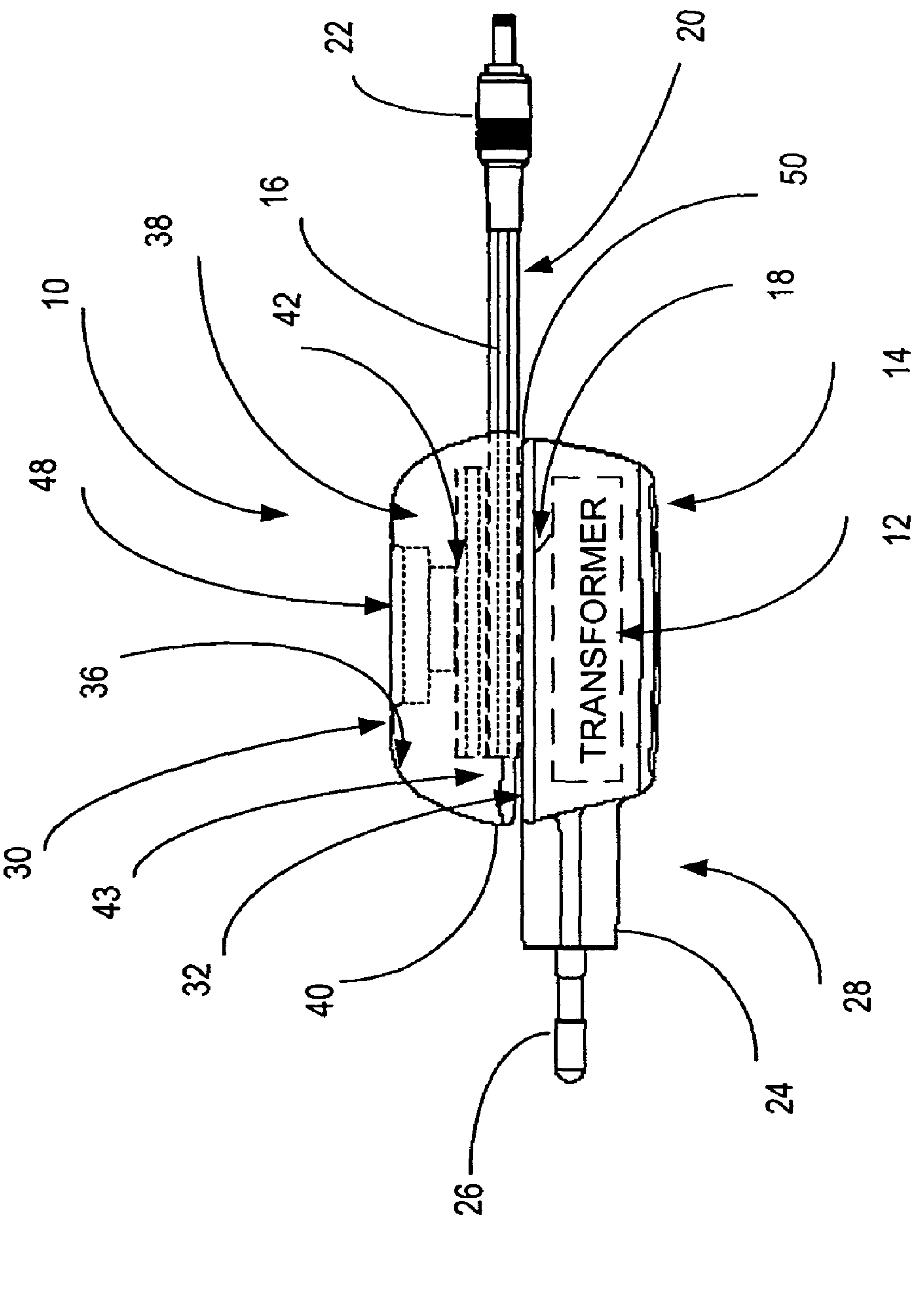
FIG. 2 is a schematic side view of the electrical apparatus showing the electrical cable passing through the closeable opening formed between the cover lip and the apparatus housing.

The cover inner surface 36 along the interior wall 44 defines a tower-like structure generally designated 48 around which the electrical cable 16 is manually retracted and wound such that the retracted electrical cable 16 is stored within the interior cavity 38 as best illustrated in FIG. 2. The cover 30 is made of a suitable resilient deformable material having shape retention memory characteristics such that a closeable opening generally designated 50 is formed between the lip of the outer peripheral edge 40 of the cover following along the path defined between the outer peripheral edge 40 and the housing 14. The cover material may be of any material well known to those skilled in the art or future developed material to carry out the intended function. The electrical cable 16 passes through and is manually guided along the closeable opening 50 and wound on to the tower 48 to retract the electrical cable. The electrical cable 16 may likewise be manually withdrawn through the closeable opening 50 to uncoil the cable from the tower 48 to pay off a desired length of the electrical cable.

Figure 3:
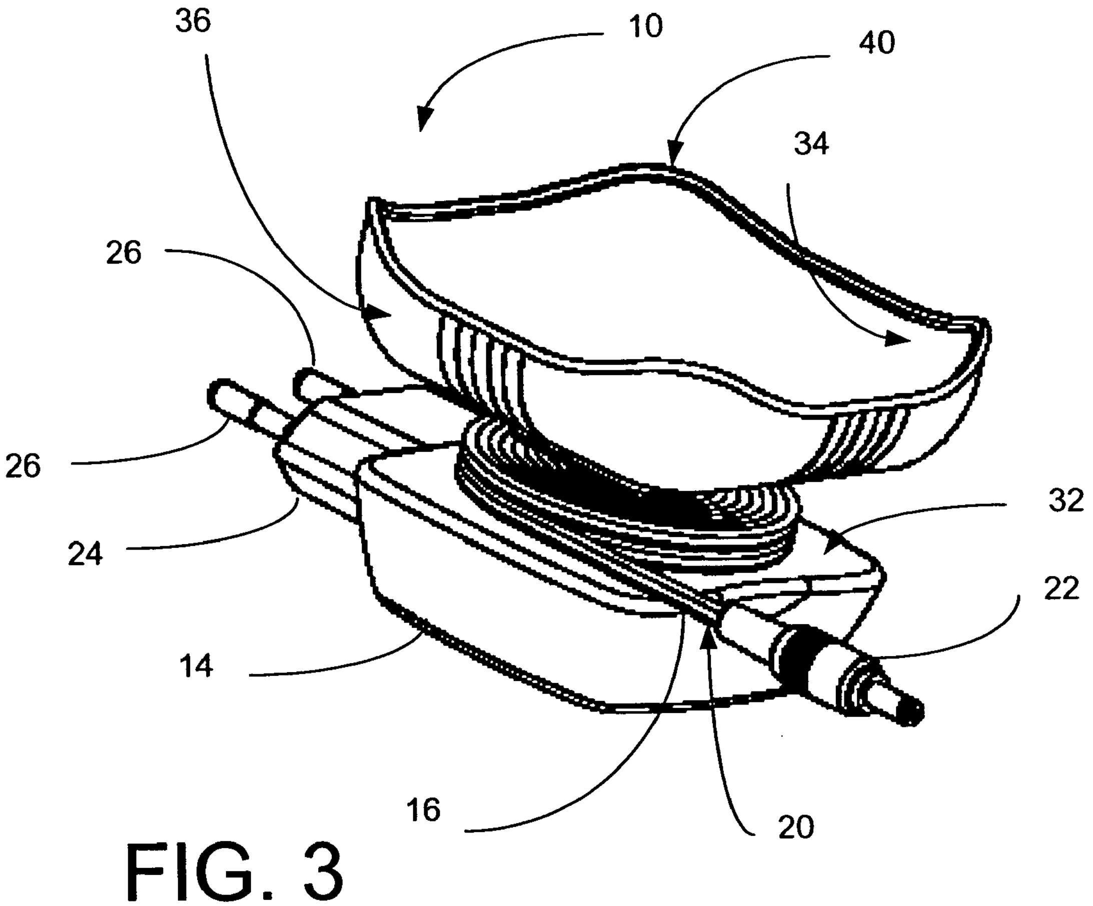
FIG. 3 is a perspective view of the electrical apparatus of FIG. 1 showing the cover flipped up revealing the electrical cable that is manually retracted or withdrawn.
Figure 4:
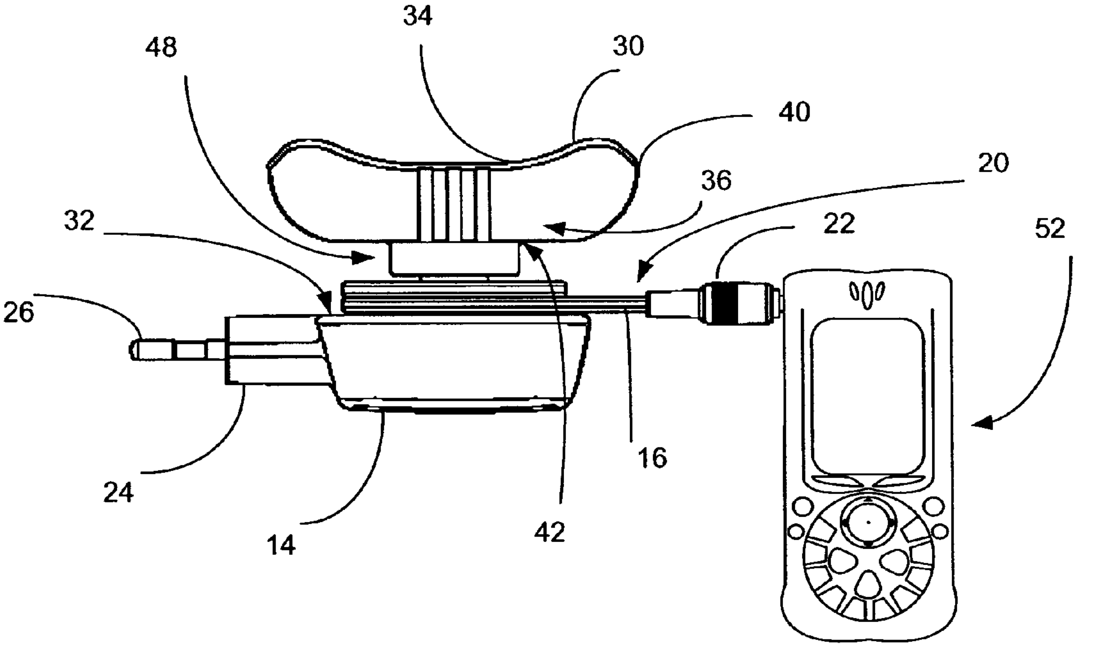
FIG. 4 is a schematic side view of the electrical apparatus showing the cover flipped up revealing the tower around which a portion of the electrical cable is manually retracted or withdrawn with the plug end of the electrical cable connected to a mobile phone.

The cover 30 may alternately be flipped up as illustrated in FIGS. 3 and 4 such that the outer peripheral edge 40 is not in contact with the surface 32 of the housing 14 to reveal the tower 48 around which the electrical cable 16 may be manually retracted and wound after which the cover 30 is flipped down such that the outer peripheral edge 40 is in contact with the outer surface 32 of the housing 14 thereby forming and defining the interior cavity 38 for retractably housing the electrical cable when the electrical apparatus is not in use. Likewise, the cover 30 may be flipped up so that the electrical cable 16 may be manually uncoiled from the tower 48 to pay off the desired length of the electrical cable. The cover 30 is then flipped down such that the peripheral edge 40 is in contact with the outer surface 32 of the housing 14 whereby the cover 30 returns to its original shape due to the memory retention characteristic of the material forming the cover 30.

It will be recognized that the electrical apparatus 10 may include a transformer 12 as illustrated in the dash-line box in FIG. 2 or may further include suitable electronic circuitry defining means to function as a charger or a switched-mode power converter or other desired operational electrical circuit means to provide the required power to an electronic device with which the electrical apparatus 10 is used. For example, the electronic device may be a mobile phone as shown in phantom in FIG. 4 and generally designated 52.

It will be further recognized that the cross-sectional geometric shape of the cover 30 may be that other than shown in the figures and for example may be doughnut shaped, trapezoidal shaped, rhomboid shaped, or other desired suitable shape and configuration to accommodate the housing with which the cover is utilized.

Electrical apparatus characterized by a cover integral with and located on an outer surface of the transformer housing and defining an interior cavity for housing a manually retracted electrical cable has been described above in several preferred embodiments. It will be recognized and appreciated that numerous modifications and alterations may be made by those skilled in the art without departing from the spirit and scope of the invention. Therefore, the invention has been described by way of illustration rather than limitation.

What is claimed is:

1. Electrical apparatus, comprising: a transformer in a housing; an electrical cable for coupling an output of the transformer to an electrical device; a cover having an inner surface and an outer surface disposed opposite said inner surface, said cover made of a resilient deformable material having a shape retention memory located on an outer surface of said transformer housing, and an interior cavity defined between said inner surface of said cover and the outer surface of said transformer housing, wherein said cover is flipped up away from said transformer housing outer surface so that a first portion of said inner surface of said cover faces outward and the remaining portion of said inner surface of said cover is flipped inside-out with said transformer housing outer surface defining a tower-like structure around which said electrical cable is manually wound wherein said cover is flipped down toward said transformer housing outer surface retractably housing said electrical cable within said interior cavity when the electrical apparatus is not in use to store the electrical cable, and such that, when in use, a desired length of said electrical cable is withdrawn from said interior cavity for connection to the electrical device.

2. The electrical apparatus defined in claim 1 further characterized in that said cover is flipped-up to manually pay-off a desired length of said electrical cable.

3. The electrical apparatus defined in claim 1 further comprising said cover having an outer peripheral lip wherein a closeable opening is defined along and between said outer peripheral lip of said cover and the said transformer housing outer surface, the closable opening through which said electrical cable is manually retracted into the interior cavity and wound around said tower-like structure defined within said interior cavity.

4. The electrical apparatus defined in claim 3 further characterized in that said electrical cable passes through said closeable opening when manually uncoiled from said tower structure to pay-off a desired length of said electrical cable.

5. The electrical apparatus as defined in claim 1 further characterized by an electrical plug integral with said transformer housing for coupling a source of commercial electrical power to an input of said transformer input.

6. The electrical apparatus as defined in claim 5 further comprising that said apparatus is a charger.

7. The electrical apparatus as defined in claim 5 further comprising that said apparatus is a charger and said electrical device is a mobile phone.

8. The electrical apparatus as defined in claim 5 further comprising that said apparatus is a switched mode power converter and said electrical device is a mobile phone.

9. The electrical apparatus as defined in claim 1 further comprising that said apparatus is an AC adapter.

10. Electrical apparatus comprising:

a housing including a transformer having an input and an output;

an electrical plug integral with said housing for coupling an AC commercial voltage outlet to an input of the transformer;

an electrical cable having one end coupled to the transformer output and an opposite end terminated in a suitable power plug for coupling the transformer output to a desired electronic device;

a cover having an inner surface and an outer surface disposed opposite said inner surface and made of a resilient deformable material having shape retention memory characteristics, said cover being located integral with and on an outer surface of said housing;

an interior cavity defined between the inner surface of said cover and the outer surface of said housing, said interior cavity further being defined by a continuous wall comprising an inner peripheral wall portion of said cover inner surface and an outer peripheral wall portion of said cover inner surface spaced from the inner peripheral wall portion, said inner peripheral wall portion flipped inside-out with the housing outer surface defining a tower-like structure around which said electrical cable is manually retracted and wound for storage within said interior cavity.

11. In an electrical apparatus having a housing for carrying a transformer and an electrical cable for coupling an output of the transformer to an electrical device with which the electrical apparatus is used, a method for retractably housing the electrical cable comprising the steps of: providing the transformer in the housing:

providing a cover made of a resilient deformable material having a shape retention memory;

locating the cover on an outer surface of the transformer housing to define an interior cavity between an inner surface of the cover and the transformer housing outer surface;

flipping up the cover away from the transformer housing outer surface so that the inner surface of the cover faces outward and a portion of the outwardly facing inner surface flipped inside-out with the transformer housing outer surface defines a tower-like structure;

manually retracting and winding the electrical cable around the tower-like structure;

flipping the cover down toward the transformer housing outer surface for retractably housing the electrical cable within the interior cavity when the electrical apparatus is not in use to store the electrical cable, and withdrawing a desired length of the electrical cable from the interior cavity for connection to the electrical device.

12. The method of claim 11 further including the steps of:

providing a closeable opening along and between the peripheral lip of the cover and the transformer housing outer surface, and manually retracting the electrical cable into the interior cavity through the closeable opening.

13. The method of claim 12 further comprising the step of winding the electrical cable around a tower defined within the interior cavity.

* * * * *